(No Model.)

E. M. TOUSLEY.
TROLLEY WHEEL.

No. 501,548. Patented July 18, 1893.

WITNESSES:
W. M. Fairfax
G. Layman

INVENTOR
Edgar M. Tousley
BY H. A. West
ATTORNEY

UNITED STATES PATENT OFFICE.

EDGAR M. TOUSLEY, OF JAMESTOWN, NEW YORK.

TROLLEY-WHEEL.

SPECIFICATION forming part of Letters Patent No. 501,548, dated July 18, 1893.

Application filed July 16, 1892. Serial No. 440,242. (No model.)

*To all whom it may concern:*

Be it known that I, EDGAR M. TOUSLEY, a citizen of the United States, and a resident of Jamestown, in the county of Chautauqua and State of New York, have invented certain new and useful Improvements in Trolleys, of which the following is a specification.

My invention relates to trolley heads for electric railway cars, and the object of my invention is to provide a trolley which shall not only possess greater durability than those in common use, but which shall be self-adjusting in the bearings of its wheel, thus insuring uniform wear and obviating flattening of the journal on the side of greatest load and the unsatisfactory results due to such wear.

Another object is to provide for practical and reliable self-lubricating of the bearings of the wheel.

Reference is to be had to the accompanying drawings forming a part of this specification in which like letters of reference indicate corresponding parts in all the figures.

Figure 1:
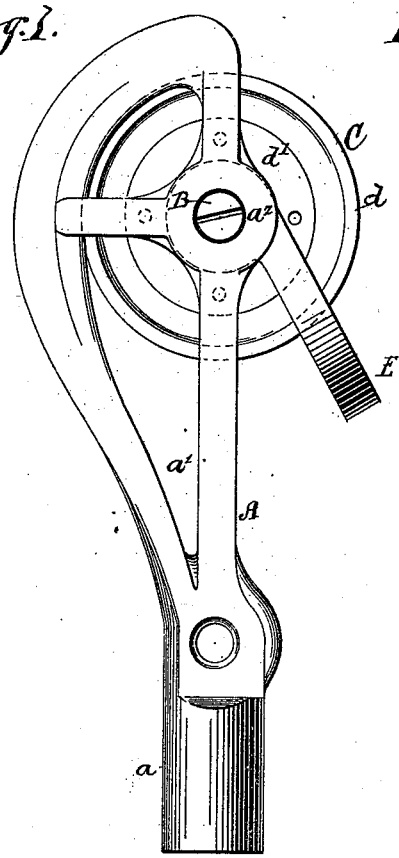
Figure 2:
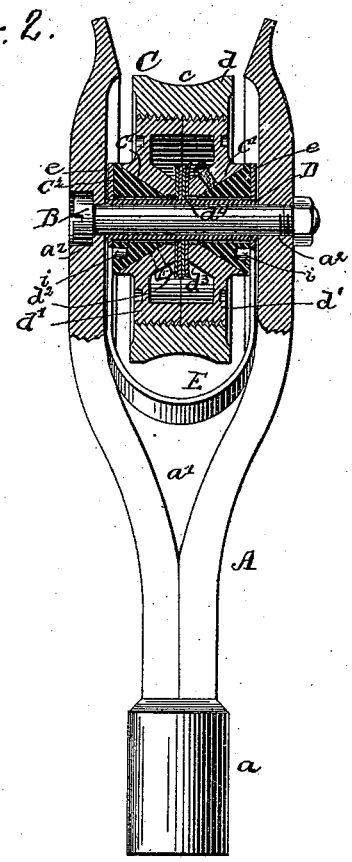
Figure 3:
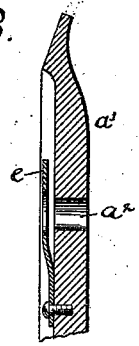
Figure 5:
Figure 4:
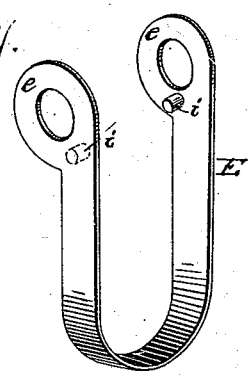

Figure 1, is a side elevation of my new and improved trolley head. Fig. 2 is a front elevation of the frame and spring partly in section and showing the wheel and its bearings in sectional elevation. Fig. 3 is a detailed sectional view showing a modified form of spring. Fig. 4 is a perspective view of the preferred form of spring, and Fig. 5, is a side view of one of the cones.

The frame A may be of any appropriate form of construction; as here shown it is formed with a socket $a$ for the pole and with the two cheek pieces $a'$ $a'$ each formed with curved retaining flanges for the wire, and with corresponding apertures $a^2$ $a^2$ to receive the small bolt or shaft B for the trolley wheel C. On the shaft is placed the tube D on the ends of which are fitted the cheeks or bearing faces $e$ $e$ of the spring E, but the tube might be omitted and the spring placed on the shaft if desired. The trolley wheel is formed with a concaved periphery $c$ and with conical side sockets $c'$ $c'$ and takes its bearing centrally on the tube or shaft and at its sides upon the cones $c^2$ $c^2$, slipped upon the tube or shaft and pressed snugly into the sockets by the action of the spring E. In this manner the wheel is given a broad conical bearing which prevents uneven wear or flattening at any point, and at the same time it is kept constantly in perfect adjustment. The cones are held from rotating with the wheel by pins $i$ attached to the spring which enter small sockets in the base of the cones as shown; and the cones are each formed at the base with a flange $c^3$ which abuts against the boss on the outer surface of the wheel to prevent the cones from wedging or binding in the sockets and to retain the oil.

The wheel by preference comprises the concaved felly $d$ screw-threaded upon the inside, and the side plates $d'$ $d'$ screw-threaded upon their edges and screwed into the felly as shown in Fig. 2. The said side plates when screwed in place form an oil chamber $d^2$ to receive oil for lubricating the cones and axle, and the inner faces are recessed to form inwardly projecting bosses $d^3$ between which is grasped an oil feeder $d^4$ of felt or other suitable material surrounding the tube for conducting the oil to the axle in suitable quantities. In the bosses are formed oil passages $d^5$ which may be loosely plugged with felt for supplying oil gradually to the surfaces of the cones.

The spring shown in Figs. 1, 2 and 4, is an independent loop spring, but instead thereof I may use any other proper form to exert a yielding or self-adjusting pressure upon the cones as, for example, a plate spring, as shown in Fig. 3 attached to the frame.

Having thus described my invention, what I claim as new, and desire to secure by Letters Patent, is—

1. The wheel formed with conical sockets at its sides and placed on an axle held in the cheek pieces of the frame combined with cones placed on the axle and fitted in said sockets and acted upon by yielding pressure for pressing the cones into the sockets, substantially as described.

2. The wheel having side plates chambered to form an oil reservoir and fitted in the felly face to face and formed with inwardly projecting bosses in combination with the axle and the oil feeder grasped between the adjacent faces of the bosses, substantially as described.

3. The felly screw-threaded upon its inner periphery and the chambered side plates screwed into the felly and formed with conical sockets, in combination with the axle, the cones, and the spring arranged to act upon the cones, substantially as described.

4. The wheel formed with conical sockets in combination with the cones, and a U-shaped spring, arranged to press upon the cones, substantially as described.

5. The side plates of the wheel formed with conical sockets in combination with the cones formed with shoulders at the base and springs for pressing the cones into the sockets, substantially as described.

6. The wheel formed with conical sockets at its sides and the spring applied thereto and pins fitted in the cones for retaining the same, substantially as described.

Signed at Jamestown, in the county of Chautauqua and State of New York, this 20th day of June, A. D. 1892.

EDGAR M. TOUSLEY.

Witnesses:
 C. R. LOCKWOOD,
 FRED. R. PETERSON.